United States Patent [19]
Bader et al.

[11] 4,248,823
[45] Feb. 3, 1981

[54] METHOD OF MAKING INK JET PRINT HEAD

[75] Inventors: Leonhard Bader, Stadtbergen; Frank Giessner, Augsburg; Ernst Pechinger, Meitingen-Herbertshofen; Friedrich B. Rombach, Augsburg; Wilhelm Ruprich, Augsburg; Helmut Weber, Augsburg; Hermann Winter, Augsburg, all of Fed. Rep. of Germany

[73] Assignee: NCR Corporation, Dayton, Ohio

[21] Appl. No.: 969,769

[22] Filed: Dec. 15, 1978

[51] Int. Cl.³ .................. B29D 19/08; B29C 6/04; G01D 15/18
[52] U.S. Cl. .................. 264/156; 249/64; 249/176; 249/177; 264/271; 264/275; 264/331; 264/334; 400/126; 425/468
[58] Field of Search .......... 264/334, 156, 271, 275, 264/331; 425/801, 468; 400/126; 346/140 PD, 140 IJ, 75; 249/64, 176, 177; 239/274, 548, 692, 696

[56] References Cited
U.S. PATENT DOCUMENTS

| | | | |
|---|---|---|---|
| 3,365,528 | 1/1968 | Riley | 264/334 X |
| 3,608,022 | 9/1971 | Wallskog | 264/334 X |
| 3,787,884 | 1/1974 | Demer | 400/126 X |
| 3,893,220 | 7/1975 | Bittner | 264/334 X |
| 4,005,440 | 1/1977 | Amberntsson et al. | 346/140 PD |
| 4,112,433 | 9/1978 | Vernon | 346/140 PD X |
| 4,158,847 | 6/1979 | Heinzi et al. | 346/140 PD |

FOREIGN PATENT DOCUMENTS 2164614  9/1973  Fed. Rep. of Germany.
2532037  1/1976  Fed. Rep. of Germany.
2543451  3/1977  Fed. Rep. of Germany.
1355915  6/1974  United Kingdom.

Primary Examiner—Philip Anderson
Attorney, Agent, or Firm—J. T. Cavender; Wilbert Hawk, Jr.; George J. Muckenthaler

[57] ABSTRACT

A mold having a desired print head shape includes a cover in which a plurality of rods or ductile fibers are attached, the cover being positioned with the rods extending into the mold and to the side opposite the cover. A hardenable synthetic material is introduced through a hole in the cover and after hardening of the material to form the print head, the rods are withdrawn from the mold to leave bores or apertures in the print head which serve as passageways for the droplets of ink.

13 Claims, 6 Drawing Figures

METHOD OF MAKING INK JET PRINT HEAD

BACKGROUND OF THE INVENTION

In the field of ink jet printers and especially in the matter of multiple-nozzle print heads, there has been a problem in maintaining the ink conduits or passageways in precise position and of keeping such conduits or passageways sealed or separated from each other in the areas of intake of the ink and of the nozzle portion of the print head. The difficulty of sealing the conduits from each other in the vicinity of the nozzles is apparent from the close proximity of the nozzles which allows or provides only a very small sealing area.

One method of making an ink jet print head has included a plastic casting wherein the resin or like material is cast at room temperature and under sufficiently high pressure to attempt to minimize the presence of air bubbles which may cause pockets or uneven surfaces for passage of the ink fluid.

Another method has included the use of elevated heat temperatures and pressures in the plastic molding, however, it has been found difficult to maintain precise position of the parts in the mold itself.

Prior art which is representative of the production of ink jet print heads includes British Pat. No. 1,355,915 and German Specification No. 2,164,614, which disclose that it is possible to replace the drive elements in the print head, but with no indication in the disclosure as to how the print heads can be produced in a simple and economic manner.

German Specification No. 2,532,037 discloses a multiple nozzle ink jet print head produced through use of ceramic plates with etching of the necessary cavities and channels therein. Such type of print head production however appears to be very complicated and involve high costs, so that the disclosed method would ordinarily be unsuitable for mass production.

German Specification No. 2,543,451 corresponding to U.S. Pat. No. 4,158,847 shows a piezoelectrically operated print head for ink printing devices which is made of plastic in a casting procedure. Protective tubes which serve as inner electrodes are inserted into ceramic tubes which serve as drive elements for the print head and metal rods are then inserted into the tubes which extend from a fluid supply cavity to the ejection nozzles. When the plastic casting has hardened, the metal rods are removed and the tubes act as channels or conduits for the ink. This structure has the disadvantage that at least a portion of the drive element is not accessible and cannot be replaced if found defective.

SUMMARY OF THE INVENTION

The present invention relates to ink jet print heads and more particularly to a method for producing a multiple nozzle ink jet print head. A mold or pattern having an inner shape of a desired print head structure is fitted with a cover of inverted dish-shape configuration having a plurality of threaded holes therein which are positioned and spaced from each other to provide a circular arrangement whereby stud elements may be inserted into the holes in a direction positioning the axis of the stud elements toward the center of the mold and along a line near the lower end thereof. The stud elements include a threaded body portion having a rod or stem secured thereto and extending therefrom to a line near the lower end of the mold. A small aperture is provided from the end of each rod or stem, such rod being spaced or maintained at a small distance from the lower edge of the mold. The end of each rod or stem is conical-shaped so as to fit with an associated aperture and to provide a decreasing diameter channel or opening for passage of drops of ink. A plurality of rods or pins are inserted through the side walls of the mold or pattern to engage with a portion of the threaded elements.

When the molding material injected into the mold or pattern has hardened and set, the stud elements, i.e. threaded body portions along with the stems or rods secured thereto, are removed from the mold and provide voids forming channels or ducts for carrying ink from the drive elements to the nozzles of the print head. The inserted rods or pins are also removed from the side walls of the mold to form channels or ducts for the ink supply to the drive elements. The drive elements for ejecting the droplets of ink from the print head nozzles are then inserted or installed in each of the voids formed by the stud element and the required electrical wires are connected to the drive elements.

In view of the above discussion, the principal object of the present invention is to provide a method of making a multiple-nozzle ink jet print head in a simple and economical manner.

Another object of the present invention is to provide a mold or pattern for making a multiple-nozzle ink jet print head wherein the mold includes a plurality of parts which are precisely positioned therein and removable therefrom for providing a number of ink-carrying channels.

An additional object of the present invention is to provide a method of making a multiple-nozzle ink jet print head wherein the cover portion of the mold receives a plurality of elements which are adjustably attached to the cover portion for enabling an accurate alignment of remote ends of the elements for locating ink jet nozzles.

A further object of the present invention is to provide a method of making a multiple-nozzle ink jet print head wherein a plurality of elements are utilized for forming channels and passageways within a mold and upon hardening of the molding material, all the elements are removed from the mold to leave channels therein for passage of ink and to position drive elements for driving ink from a supply cavity to droplet producing nozzles.

Additional advantages and features of the present invention will become apparent and fully understood from a reading of the following description taken together with the annexed drawing.

DESCRIPTION OF THE PREFERRED EMBODIMENT

Figure 1:
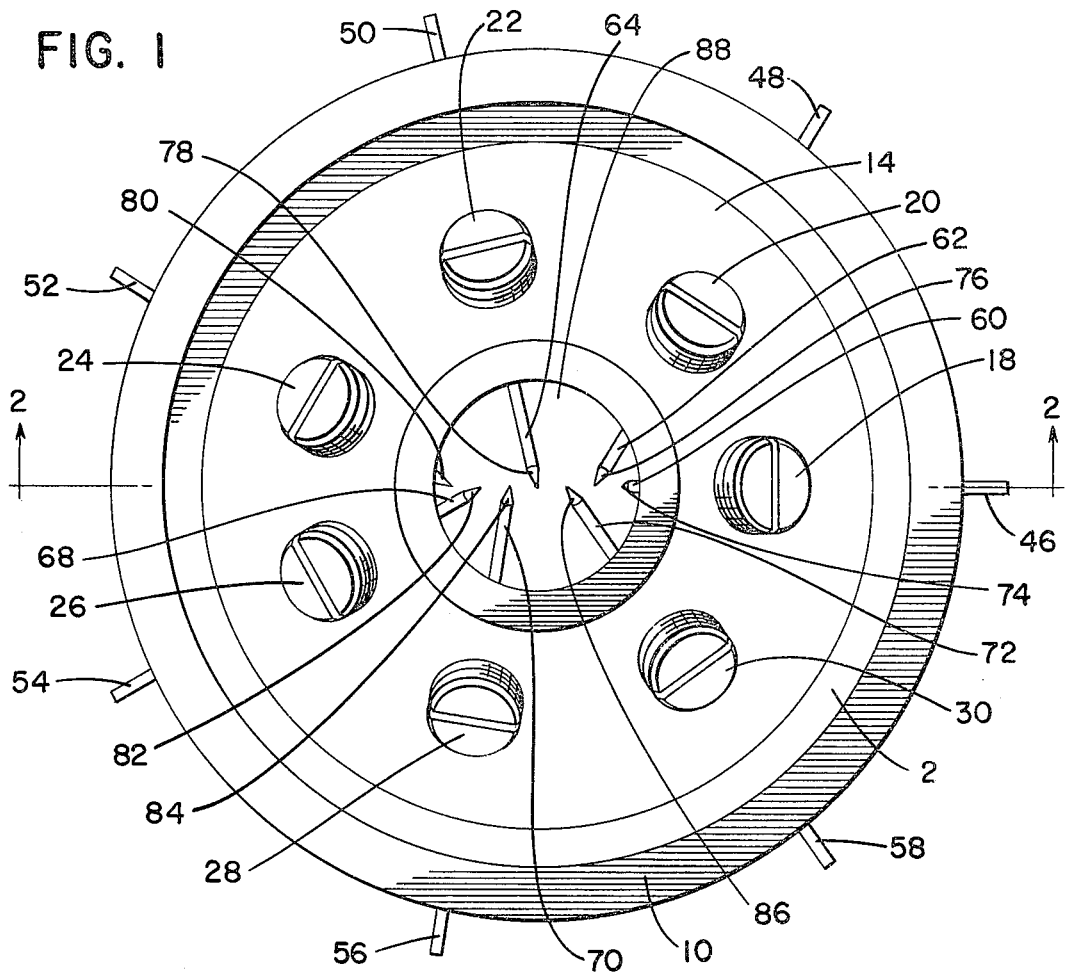
FIG. 1 is a plan view of a mold or pattern used for the performance of the method according to the present invention.
Figure 2:
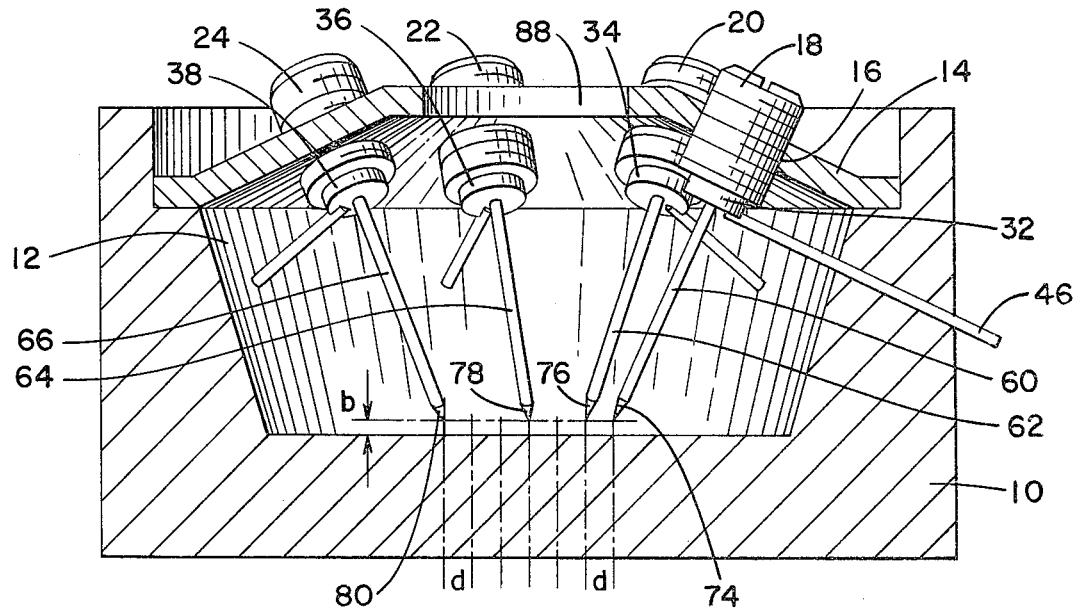
FIG. 2 is a sectional view of the mold taken along the line 2—2 of FIG. 1.

Referring to FIGS. 1 and 2, which respectively show a plan view and a sectional view of a mold or hollow form for use in making a multiple-nozzle ink jet print head according to the present invention, and in which corresponding parts are provided with the same reference numbers, there is shown a mold 10 having a cylindrical outer shape and defining a molding cavity 12 which is a determining factor in selecting the shape of the print head to be produced. In the preferred embodiment of the present invention, such cavity 12 is in the form of a frustum or cone which shape facilitates easy removal of a print head after the hardening of the molding material. A cover portion 14 is provided to fit over the upper open portion of the mold 10, such cover portion having a dish-like shape with sloping or slanting sides to provide an inclined inner form and of a size to fit beyond the edge of the cavity 12. The cover portion 14 has on its slanting or sloping sides preferably a plurality of circular openings 16 which are arranged in a circle and which receive the stud or like plug elements necessary for the production or forming of ink supply channels. In the embodiment according to FIGS. 1 and 2, the openings 16 are tapped to screw-threadedly receive the stud or plug elements 18, 20, 22, 24, 26, 28 and 30. The elements 18 through 30 include reduced diameter portions 32, 34, 36, 38, 40, 42 and 44, although portions 40, 42 and 44 are not shown in FIG. 2, and are each provided with threads so that they can be precisely positioned in the cavity 12 of the mold 10 by turning or rotating same into the threaded holes 16 of the covered portion 14.

The seven stud elements 18 through 30 provide capillary ink cavities as well as drive element receiving cavities or bores for the production of a multiple-nozzle ink jet print head with the details of the cavities being later described. In addition, the stud elements can be precisely positioned with respect to the cover 14 and with ink inlet and outlet channels in the mold 10.

A plurality of ink inlet channels are provided by inserting rods or pins 46, 48, 50, 52, 54, 56 and 58 through appropriate openings in the sides of the mold 10 and extending to positions in the molding cavity 12 whereat the ends of the rods or pins are adjacent and engage with the reduced diameter portions 32 through 44 of the threaded stud elements 18 through 30. In addition to the reduced diameter portions 32 through 44 of the threaded stud elements or members 18 through 30 for providing the capillary ink cavities, each of such reduced diameter portions has a stem in the form of a rod secured thereto and identified by the stems 60, 62, 64, 66, 68, 70 and 72, which stems project downwardly into the mold cavity 12 to terminate at a precise distance from the bottom of such cavity 12. The slope of the openings 16 in the cover portion 14 thus provide the precise angular location of each of such stems 60 through 72 within the mold cavity 15, while the threads thereof permit axial adjustment of such stems 60 through 72 with respect to the bottom of such mold cavity. Essentially, the apertures or openings 16 in the cover portion 14 are provided to permit placing of the stud elements 18-30 therein so that the terminal ends of the stem portions 60-72 are in a straight line adjacent the bottom of the mold 10.

Figure 3:
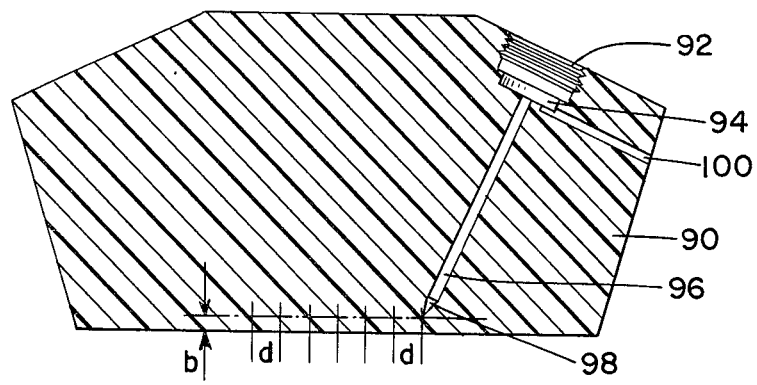
FIG. 3 is a sectional view showing ink passageways for one nozzle of a multiple-nozzle ink jet print head as produced by means of the mold according to FIGS. 1 and 2.

The slope of the frustum-like cover portion 14 is chosen so that the direction of the stems 60 through 72 in the cavity 12 is determined in such a manner that therefrom results the desired run or path of the nozzle channels produced in the print head, as illustrated in FIG. 3. The threaded holes 16 in the cover portion 14 further extend in a suitable direction with tips 74, 76, 78, 80, 82, 84 and 86 of the respective stems 60 through 72 of the studs elements being conical-shaped and directed to form a line adjacent the bottom of the molding cavity 12 and with the tips being separated from one another by a distance "d". The aligned nozzles of the print head are then produced from the conical tips of the stems 60 through 72 in a manner of drilling or boring through a small portion of the print head molding, after hardening thereof, from the outside of the molding to the tips of the stems.

The method of the present invention provides that the length of the threaded members 18 through 30 is chosen so that upon insertion of the members into the threaded holes 16 of the cover portion 14, the lower stems of the threaded members project beyond the cover portion and into the molding cavity 12. Hence, with the aid of a conventional screwdriver, each of the stud members 18-30 can be turned or rotated in the cover 14 in a manner that the tips 74 through 86 of the stems 60-72 have a constant distance "b" from the bottom of the mold cavity 12.

When the studs 18 through 30 have been inserted into the cover portion 14 and appropriately adjusted therein, the cover portion is placed on the mold 10 and firmly held or clamped thereon so as to remain in place when the molding material is injected into the mold cavity 12. As illustrated (FIGS. 1 and 2), a central opening 88 is provided in the cover portion 14 through which the molding material is poured or transmitted until the upper level of the material has reached the opening. While the molding material may of course be in the fluid or molten state when it is poured, the various members and associated parts in the mold cavity 12 must be maintained in position to provide the correctly and precisely-positioned channels and ducts for the transmission of the ink. The molding or casting material is preferably a ductile plastic which is responsive to heat and pressure during the hardening process and is of a type known to one skilled in the art.

When the molding or casting material which has been poured into the mold 10 is hardened, the studs 18 through 30 can be turned or rotated reversely with a screwdriver and out from the cover portion 14. The cover portion 14 can then be removed from the mold 10. A finished multiple-nozzle ink jet print head, including all the required channels and cavities, can thereafter be removed from the mold 10 after removal of the inlet channel pins 46 through 58.

Figure 4:
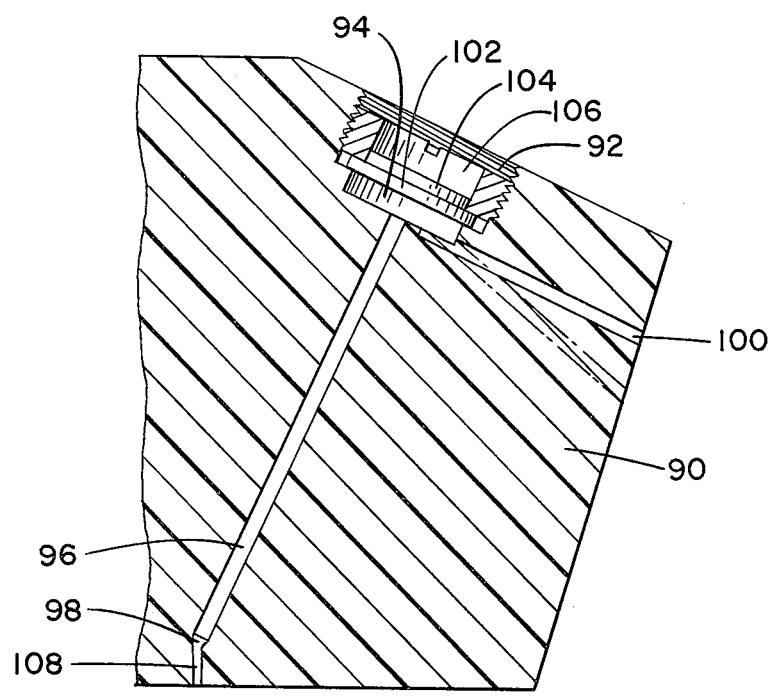
FIG. 4 is an enlarged sectional view of that portion of the print head of FIG. 3 including associated ink drive elements as arranged according to the present invention.

FIG. 3 is a sectional view of a print head 90 showing one operating cavity and channel arrangement after removal of the head from the mold 10, and FIG. 4 is an enlarged sectional view of a portion of the print head 90 as produced according to the method of the present invention.

In the sectional view of the head 90 in FIG. 3, it is the area as produced by the stud 18 and the associated parts shown in FIGS. 1 and 2 and which can be seen as providing the cavities and channels for the flow of the ink.

The area of consideration is comprised of the cavity or bore 92 for receipt of the ink droplet drive elements, which bore is produced by the stud 18 of FIGS. 1 and 2. The capillary pressure cavity 94, the channel 96 and the cone 98 make up the chamber and passageway for the ink with the capillary cavity 94 being connected with an ink supply channel 100 which was produced by the pin 46 of FIGS. 1 and 2 and leading laterally out of the print head 90. The ink supply channel 100 can also be provided in a manner other than that as previously described with respect to the pins 46 through 58, the essential thing being that same is appropriately arranged so that a supply of ink is maintained at the capillary cavity 94.

It is through the advantageous form of the stud or threaded elements 18 through 30 and their special arrangement in the cover portion 14 and in the mold 10, as seen in FIGS. 1 and 2, that upon the production of the print head 90, the bores required for the drive elements are each provided with a threaded portion as seen in the bore 92 in FIGS. 3 and 4. In each of the bores 92 of the print head 90, as shown in FIG. 4, is fixed the drive elements in the form of a membrane 102 and a piezo crystal 104 which are secured as by bonding thereof to each other so as to form an integral drive element. Since, as already stated above, the bores 92 produced by the studs 18 through 30 include threads in the walls thereof, the drive elements can, by an appropriate hollow screw or threaded bushing 106, be turned or screwed into the bore 92 and be pressed against the capillary cavity 94 for a precise covering of the capillary cavity. A permanent fastening is thus made possible between the drive element and the portions of the print head 90 lying beyond the diameter of the capillary cavity 94.

FIG. 4 illustrates an enlarged view of the bore 92 area of the print head 90 as seen in FIG. 3 and as produced by the stud or threaded member 18 from FIGS. 1 and 2, and with the casting material defined by the distance "b" of the print head 90, as shown in FIG. 3, having been bored or drilled to provide an outlet nozzle 108 as defined by the tip 98 to expose the ink channel 96 to the exterior of the print head for ejection of the droplets of ink therefrom. The droplet producing pressure waves or pulses are caused by the energization of the piezo crystal 104 and the resultant bending of the membrane 102 which is thereby caused to be moved into the capillary pressure cavity 94 there maintained full of ink. Upon pulsing the crystal 104, ink is caused to be transmitted from the cavity 94, through the channel 96, the cone 98 and the nozzle 108, respectively, to be ejected as a droplet of ink for impinging upon a record medium which is not shown but which in a suitable manner is normally positioned opposite the nozzle 108. The ink supply to the capillary pressure cavity 94 occurs through the ink supply channel 100, which extends to the capillary cavity at an angle of from 0 to 15 degrees as seen by the solid and the dashed lines in FIG. 4.

In the print head 90, FIG. 3, as produced by means of the mold 10 and the associated elements of FIGS. 1 and 2, the studs 18 through 30 with the threaded bodies were turned or rotated into the threaded holes 16 of the cover portion 14. In this manner, the bores or cavities 92 for the drive elements include the threaded portions for reception of the hollow screw or cap 106 for securing the drive elements 102 and 104 in position over the capillary pressure cavity 94.

Figure 5:
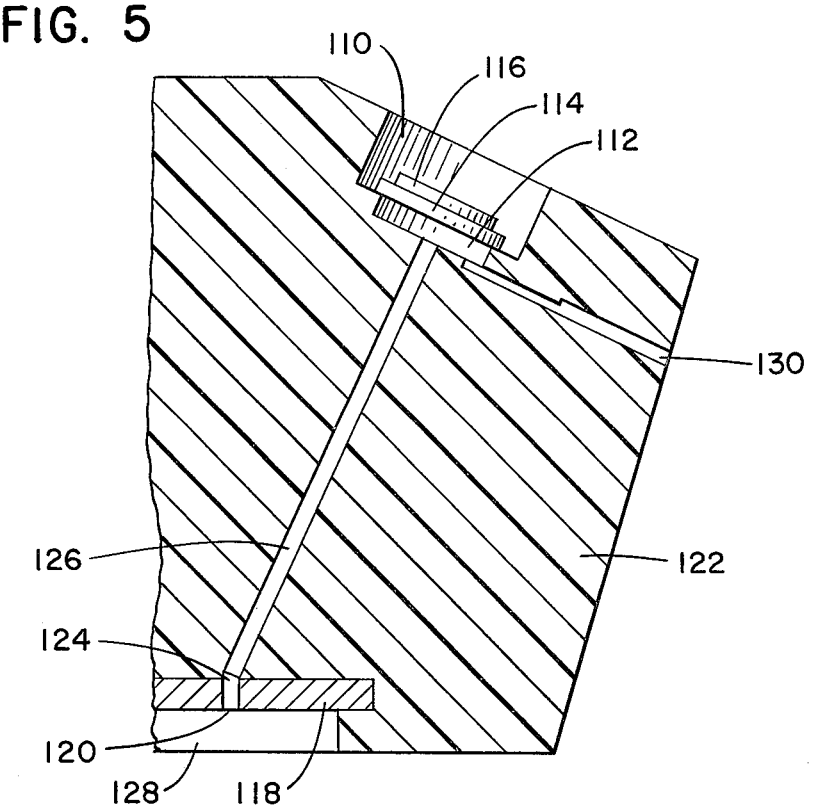
FIG. 5 is a sectional view of a portion of a print head showing a second embodiment of the present invention.

FIG. 5 is an enlarged sectional view of a portion of a print head showing a modification or a second embodiment thereof differing from the print head 90 of FIG. 4. It is seen that instead of the mold 10 having a cover portion 14 including threaded holes 16 being used, there can be used a cover portion with holes or apertures which are not threaded and whereby the stud elements which are to be inserted have smooth walls and produce drive element receiving bores or cavities without internal threads. Such a bore 110 is shown in FIG. 5 wherein the drive elements 114 and 116 which cover and hermetically seal a capillary pressure cavity 112 therefor must be secured in the bore in another manner. In the embodiment shown in FIG. 5, the membrane 114 to which is bonded the piezo crystal 116 is likewise bonded to the print head portion or ledge which extends beyond the diameter of the capillary cavity 112 at the lower side of the bore 110.

Another advantageous variation in the production of a print head consists in the tips 74, 76, 78, 80, 82, 84 and 86 of the stems of the studs or threaded elements 18-30 being inserted into a nozzle plate 118 which is cast integral into the print head to be produced, thereby maintaining the tips more exactly fixed in position. In this case, as also illustrated in FIG. 5, the nozzles to be produced can be made with more exactness since the nozzle plate 118 having to be cast integral into the print head already includes the necessary number of nozzle openings as at 120 in an exactly predetermined position. A channel tip 124 of a nozzle channel 126 projects into the nozzle opening 120 and the nozzle channel 126 leads into the capillary pressure cavity 112 which is covered by the membrane 114 with the piezo crystal 116 bonded or otherwise secured thereto. The lower portion of the print head 122 (FIG. 5) is provided with a recess 128 as the nozzle plate 118 is cast integral into the print head and the nozzle openings 120 of the nozzle plate are protected from outside influence.

A further advantageous feature in the production of the print head 122 provides that the supply channel 130 for the capillary pressure cavity 112 be produced with cross-sections becoming smaller in the direction toward the pressure cavity. This reduction of the cross-section of the supply channel 130 provides that each such supply channel achieves a better decoupling of the nozzle channel 126 and the capillary pressure cavity 112 from the ink supply system whereby the print head operates in a smoother manner and is not subjected to extreme fluctuations in supply and flow of ink.

Figure 6:
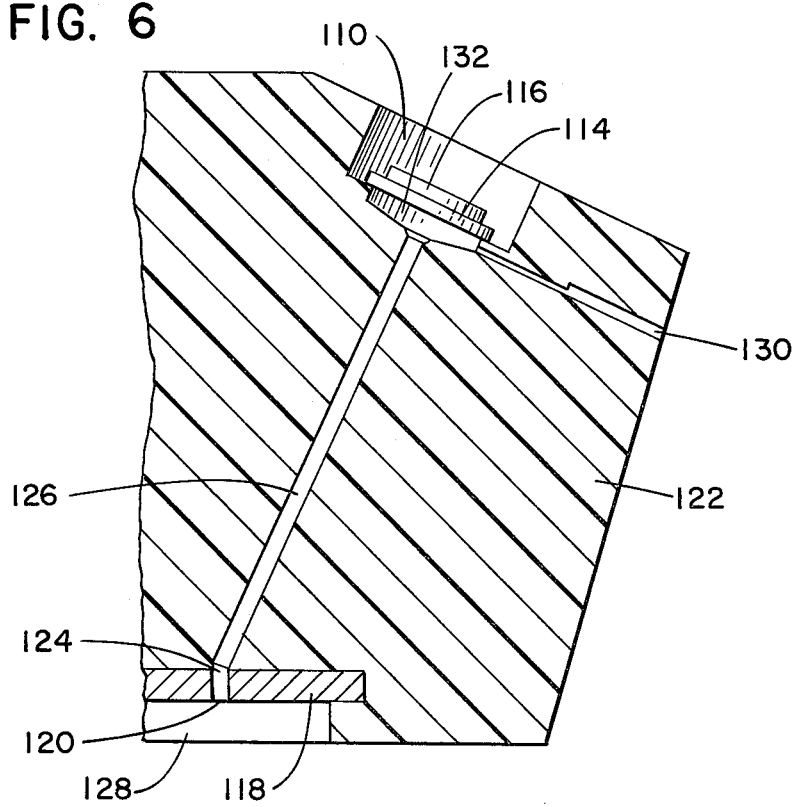
FIG. 6 is a sectional view of a portion of a print head showing a third embodiment of the present invention.

FIG. 6 illustrates a sectional view of a portion of a production variation of a print head substantially the same as FIG. 5 and which is especially applicable in the scope of the present invention and wherein the capillary pressure cavity 132 includes a conical slope towards the nozzle channel 126. The slope of such cavity 132, which is preferably at an angle between two and five degrees as shown in FIG. 6, can be produced in a simple manner by means of the mold 10, per FIGS. 1 and 2, since the portions of the studs 18 through 30 only have to be formed conical toward the stems 60 through 72.

The sloping of the capillary pressure cavity 132 as seen in FIG. 6 and as per the present invention provides that, upon the filling with ink of the capillary pressure cavity 132 and the nozzle channel 126, the ink flowing through the supply channel 130 is directed to and flows along the outside wall of the capillary pressure cavity 132 wherein any air bubbles along the outside wall are removed by the presence of the ink. After the outside walls are circularly surrounded by ink, that ink which is flowing in towards the center of the capillary pressure cavity 132 and flowing towards the nozzle channel 126 causes any further air bubbles which are still in the cavity 132 to be pressed towards the nozzle channel 126 and through the channel toward the nozzle 120. The advantageous sloping of the capillary pressure cavity 132 therefore enables that the print head 122 can be filled with ink without air bubbles being kept back during the filling process and that no additional venting means or like measures are required during the filling of the channels and passageways with the initial supply of ink. It is evident that although the inventive formation of the capillary pressure cavity 132, as seen in FIG. 6, is especially suited for the print head produced according to the present invention, the person skilled in the art can also successfully use such a sloping of the capillary pressure cavity with other print heads.

It is thus seen that herein shown and described is a method for making an ink jet print head which includes the positioning of the several elements so as to provide for passageways and channels for droplets of ink and for adjusting or moving the several elements to provide for a precise positioning of the ink nozzles. The method of producing the print head enables the accomplishment of the objects and advantages mentioned above, and while a preferred embodiment and modifications thereof have been disclosed herein, other variations thereof may occur to those skilled in the art. It is contemplated that all such variations and modifications not departing from the spirit and scope of the invention hereof are to be construed in accordance with the following claims.

What is claimed is:

1. A method of making an ink jet print head comprising the steps of:
    providing an open end mold having an inner shape corresponding to the print head to be cast,
    covering the open end of said mold with a member having an inclined inner portion and a plurality of apertures spaced therearound,
    inserting stud members having stem portions into said apertures to cause said stem portions to extend within said mold and terminate along a plane spaced from the bottom thereof, each of said stud members having a shape to form a cavity for receipt of an ink drive element,
    inserting pin members at an angle into the side of said mold to reach the lower portion of said stud members,
    filling the mold with hardenable casting material to form the print head,
    forming a plurality of nozzles by boring holes in an alignment perpendicular to said mold bottom plane and to the terminus of said stem portions for enabling ejection of droplets of ink from said print head, and
    removing the stud members and the pin members to provide cavities for insertion of said ink drive elements and to provide passageways for flow of ink therethrough.

2. The method of claim 1 wherein each of said stud members includes a portion adjacent the stem portion for formation of a cavity of reduced diameter.

3. The method of claim 1 wherein each of said stud members includes a portion adjacent and slanting toward said stem portion for formation of a reduced diameter sloping cavity.

4. The method of claim 1 including the additional step of providing threads in the apertures of said covering member.

5. The method of claim 1 wherein the forming of said nozzles includes the further step of placing an apertured nozzle plate at the bottom of said mold at the terminus of said stem portions.

6. The method of claim 1 wherein said pin members include a reduced portion adjacent the stud members.

7. The method of claim 4 including the additional step of screw-threadedly engaging said stud members with said covering member apertures for axially adjusting the terminal ends of said stem portions with respect to the bottom of said mold.

8. A method of making a multiple nozzle ink jet print head of hardenable cast material comprising the steps of:
    providing a mold having a cavity of a form corresponding to the print head to be cast,
    covering the open end of said mold with a member having an overlapping rim for engaging with said mold and having an inclined inner portion with a plurality of apertures spaced therein, said member having an opening surrounded by the inclined portion for receiving the cast material,
    inserting plug members having stem portions into said apertures at an angle with respect to the inclined portion to cause said stem portions to extend toward the bottom of the mold and along a straight line of a plane spaced from the bottom thereof, each of said plug members having a shape to form a cavity for receipt of an ink drive element and a capillary cavity for receipt of ink therebelow,
    inserting pin members into the side of the mold to extend into the capillary cavities defined by the plug members,
    filling the mold with the hardenable casting material through the opening in the cover member,
    forming a plurality of nozzles by boring holes along said straight line perpendicular to said plane and to the bottom end of said stem portions for enabling ejection of droplets of ink, and
    removing the plug members and the pin members to provide passageways and capillary cavities for flow of ink, to provide cavities for insertion of the drive elements, and to provide channels for passage of ink to said ink nozzles.

9. The method of claim 8 including the additional step of providing threads in the apertures of said covering member.

10. The method of claim 8 wherein the plug member shape for use by the ink drive element has a sloping portion adjacent the stem portion.

11. The method of claim 8 wherein said pin members include a reduced cross sectional area adjacent the plug members.

12. The method of claim 9 including the additional step of providing threads on said plug member and engaging said plug members with said covering member for adjusting said stem portions for defining said straight line along the bottom of said mold.

13. The method of claim 9 wherein the forming of said nozzles includes the further step of placing an apertured nozzle plate at the bottom of said mold at the terminus of said stem portions.

* * * * *